(12) United States Patent
Lieber (10) Patent No.: US 9,816,630 B1
(45) Date of Patent: Nov. 14, 2017

(54) VALVE FOR ADJUSTING THE GAS PRESSURE INSIDE A TENNIS BALL

(71) Applicant: John H Lieber, Tulsa, OK (US)

(72) Inventor: John H Lieber, Tulsa, OK (US)

( * ) Notice: Subject to any disclaimer, the term of this patent is extended or adjusted under 35 U.S.C. 154(b) by 99 days.

(21) Appl. No.: 14/121,993

(22) Filed: Nov. 12, 2014

(51) Int. Cl.
*A63B 41/12* (2006.01)
*F16K 15/20* (2006.01)
*A63B 41/00* (2006.01)

(52) U.S. Cl.
CPC ............ *F16K 15/202* (2013.01); *A63B 41/00* (2013.01)

(58) Field of Classification Search
CPC ........ F16S 15/202; F16S 15/20; F16S 15/147; Y10T 137/7879; Y10T 137/7882; Y10T 137/3584; A63B 39/04; A63B 41/04; A63B 2102/02; F16K 15/202; F16K 15/20; F16K 15/147
See application file for complete search history.

(56) References Cited

U.S. PATENT DOCUMENTS

| | | | | |
|---|---|---|---|---|
| 584,091 A * | 6/1897 | Leidich | ................ | F16K 15/147 137/849 |
| 1,596,320 A * | 8/1926 | Sonnett | ................ | F16K 15/202 137/223 |
| 1,951,565 A * | 3/1934 | Sonnett | ................ | F16K 15/202 137/223 |
| 1,992,764 A * | 2/1935 | Perry | .................... | F16K 15/202 137/223 |
| 2,065,121 A * | 12/1936 | De Laney | ............. | F16K 15/202 473/610 |
| 3,621,876 A * | 11/1971 | Campbell | ............... | E04G 21/18 137/846 |
| 4,012,041 A * | 3/1977 | Hoffman | ................ | A63B 39/04 473/593 |
| 4,240,630 A * | 12/1980 | Hoffman | ................ | A63B 39/04 137/846 |
| 4,465,102 A * | 8/1984 | Rupp | .................... | F16K 15/147 137/512.4 |
| 5,033,498 A * | 7/1991 | Brandt | ...................... | F16K 7/20 137/223 |
| 5,915,407 A * | 6/1999 | West | ..................... | F16K 15/202 137/223 |
| 8,627,859 B2 | 1/2014 | Dirst | | |
| 9,173,430 B1 * | 11/2015 | Harvell | ................... | F16K 31/53 |
| 2005/0043703 A1 * | 2/2005 | Nordgren | .......... | A61M 25/0075 604/500 |

* cited by examiner

*Primary Examiner* — Joshua Kennedy (57) ABSTRACT

A repeatable use valve in a tennis ball that uses a common sports ball inflation needle inserted into and through the valve to increase or decrease the pressure inside the ball. The increase or decrease in pressure will cause the ball to have respectively higher or lower bounce. The valve can be installed in new tennis balls at the time of manufacture. The valve can also be installed in used tennis balls, including used tennis balls that have lost some or all of their original factory pressure.

1 Claim, 12 Drawing Sheets

VALVE FOR ADJUSTING THE GAS PRESSURE INSIDE A TENNIS BALL

CROSS REFERENCE TO RELATED APPLICATION

This application claims the benefit of provisional patent application Ser. No. U.S. 61/962,728 filed Nov. 15, 2013 by the present inventor.

BACKGROUND—PRIOR ART

There are several reasons why a tennis player might desire to increase or decrease the gas pressure inside a tennis ball:

1. After the passage of time, tennis balls lose pressure, even though most of the felt covering is still on the ball. This causes the balls to have less bounce and velocity and for many players this makes the game of tennis less enjoyable. Many players simply discard these "lost pressure" balls and purchase new ones. A method to quickly and repeatedly re-pressurize the balls that have lost pressure will extend the playing life of balls, thus saving the cost of buying new balls, saving the resources used to make new balls and saving the pollution of disposing of the discarded used balls.
2. A newly manufactured tennis ball has a specified gas pressure, which causes the ball to have a specific bounce and velocity upon being struck by a racquet. A player may want to quickly increase the gas pressure inside the ball to increase the bounce of the ball and to increase the strike velocity. A player might do this in order to add more challenge, speed and excitement to the game, similar to some automobile owners modifying the "stock" engines of their vehicles to provide more power and speed. Other players may want to practice with "supercharged" balls to better prepare themselves for competition with other players who hit the balls with high velocity.
3. When playing tennis outdoors on cold days, balls have less bounce and velocity because the colder gas inside the ball exerts less pressure on the inside of the ball. A method to quickly increase gas pressure inside the ball will allow a player to have a ball with normal bounce and velocity on a cold day.
4. Some players may want to use a method that will quickly and repeatedly decrease the gas pressure inside a tennis ball. In examples 2 and 3 above, a player may want to do so after finishing the activity when the increased pressure was desired. Beginning tennis players may want to decrease pressure in new tennis balls so the ball is easier to control or have lower velocity when struck by the racquet, and then increase pressure in the same ball as the player becomes more skilled. In high altitude locations, the factory gas pressure of normal tennis balls makes the balls bounce higher and with more velocity, which some players do not like. Manufacturers do make high altitude balls for this situation, but such balls might not always be available for purchase and they cannot be re-used by a player who may travel to a high altitude area and then return to a low altitude area. Being able to quickly adjust the gas pressure will enable to player to use the same balls in high altitude, low altitude and everywhere between.

Disadvantages of Current Methods.

There are existing methods that claim to increase the gas pressure inside tennis balls. A discussion of some of the methods is found in U. S. Patent Office document US20100307637. Some existing methods require tennis balls to be placed in a sealed container that has a higher gas pressure than the inside of the tennis ball. The marketers of these existing methods claim that, over time, the higher outside pressure gas will permeate the rubber of the ball and cause the inside pressure of the ball to increase. The disadvantages of this method include:

1. It does not work with some balls.
2. The sealed containers can be expensive, costing from $20 to $5000.
3. The process, even if it works, is time consuming. It can take several days or more for the gas pressure inside the ball to reach a satisfactory level.
4. Because some embodiments of this method involve a high pressure container, there is a danger of explosion and injury.
5. The apparatus for some of the existing methods cannot be operated by a lay person.
6. Some of the apparatus requires the use of a special gas instead of regular air.
7. These methods do not allow for decreasing the pressure inside a ball.

There are some patents that have been issued for methods of injecting gas into tennis balls using a sharp syringe device that penetrates the rubber bladder of the tennis ball, similar to a hypodermic injection in a human. These methods can cause injury to the user, don't work well, and require new materials such as sealants for each injection. These methods do not allow for decreasing the pressure inside a tennis ball.

SUMMARY

One embodiment describes a repeatable use valve in a tennis ball that uses a common sports ball inflation needle inserted into and through the valve to increase or decrease the pressure inside the ball. The increase or decrease in pressure will cause the ball to have respectively higher or lower bounce. This is similar to the process by which other sports balls such as soccer balls and basketballs are inflated and deflated. To increase the pressure inside the tennis ball, the needle is connected to a source of positive gas pressure such as a common air pump. To decrease the pressure inside the tennis ball, the needle is inserted into and through the valve and gas from inside the valve passes from inside the ball through the needle to the outside of the ball. When the desired amount of increased or decreased pressure has been accomplished, the needle is removed and the valve closes.

ADVANTAGES

The valve described in this application overcomes all of the disadvantages of the prior art described above. The valve is a means in which the gas pressure inside a tennis ball can be safely and quickly increased or decreased, using regular air or a special gas, through a valve in the tennis ball that can be used repeatedly. The valve can be installed in new tennis balls at the time of manufacture. The valve can also be installed in used tennis balls, including used tennis balls that have lost some or all of their original factory pressure. The valve will extend the playing life of balls, thus saving the cost of buying new balls, saving the resources used to make new balls and saving the pollution of disposing of the discarded used balls

DRAWINGS—BRIEF DESCRIPTION OF THE DRAWINGS

FIG. 1A is an outside view and FIG. 1B is a cross sectional view showing the interior structure of the inflation needle.

DETAILED DESCRIPTION

First Embodiment—FIGS. 1 Through 10

Reference Numeral Listing

Figure 1A:
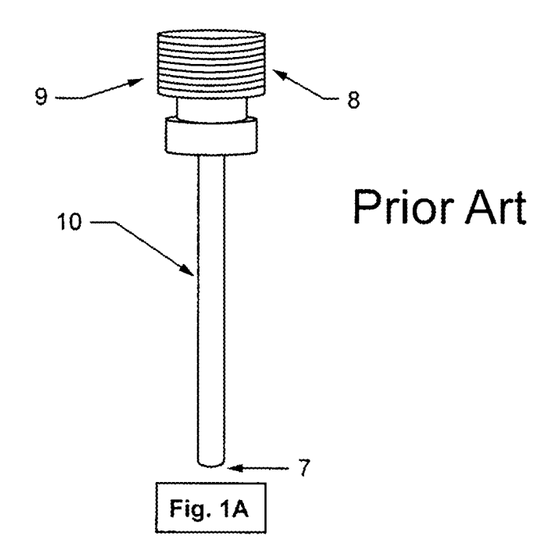
FIGS. 1A and 1B are lengthwise cross sections of a common sports ball inflation needle.
Figure 1B:
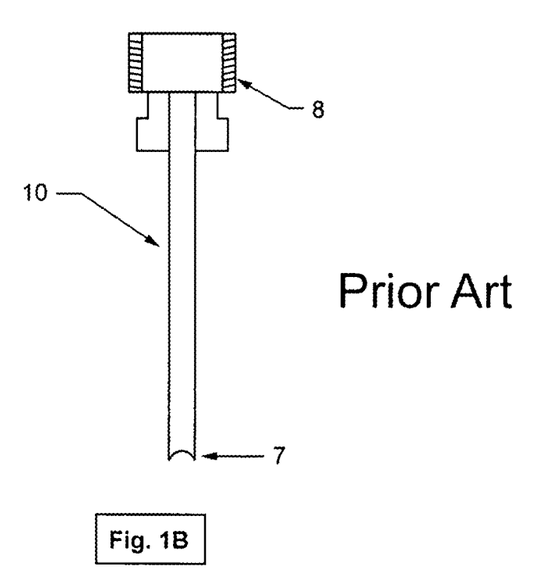

1—Flange
2—Stem
3—Bottom of Stem
4—Slit
5—Valve Opening
6—Needle
7—Air Opening of Needle
8—Needle Head
9—Threads
10—Shank
11—Conical Hole
12—Ball Rubber Bladder
13—Interior Gas Space of Tennis Ball
14—Ball Felt FIGS. 1A and 1B are lengthwise drawings of a common sports ball inflation needle. It is usually made of metal and consists of a threaded head, and a hollow shank. There are air openings in the head and end of the shank. The head is fastened to a pump and air flows from the opening in the head, through the hollow shank, out of the air opening at the end of the shank and into the sports ball.

Figure 2:
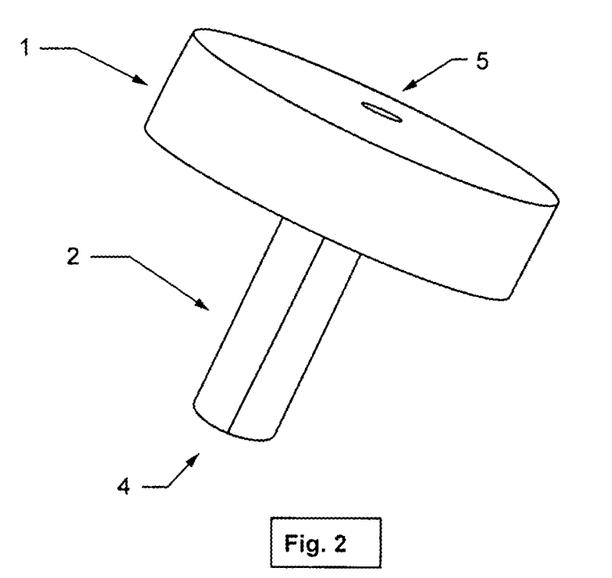
FIG. 2 is a perspective view of the first embodiment of the valve that accepts the inflation needle.
Figure 3A:
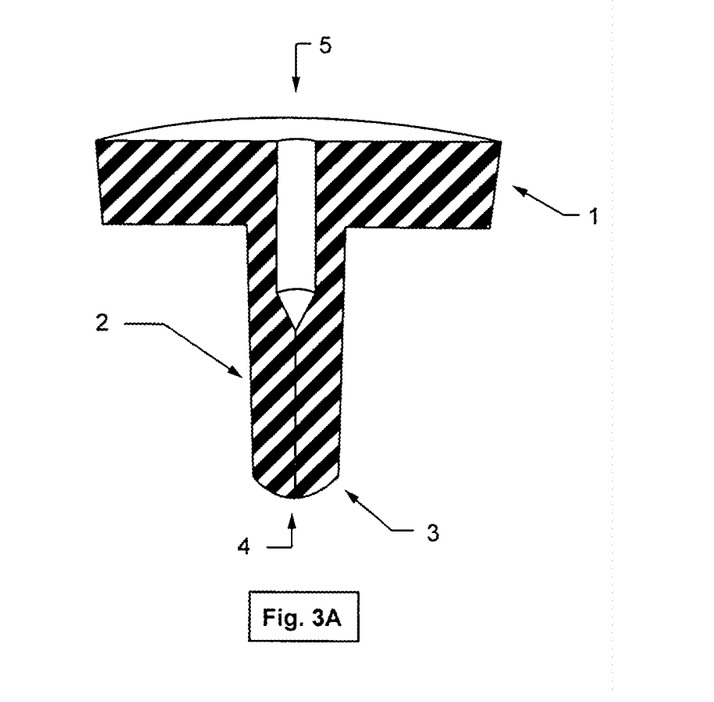
FIGS. 3A and 3B are cross sectional views of the first embodiment of the valve that accepts the inflation needle.
Figure 3B:
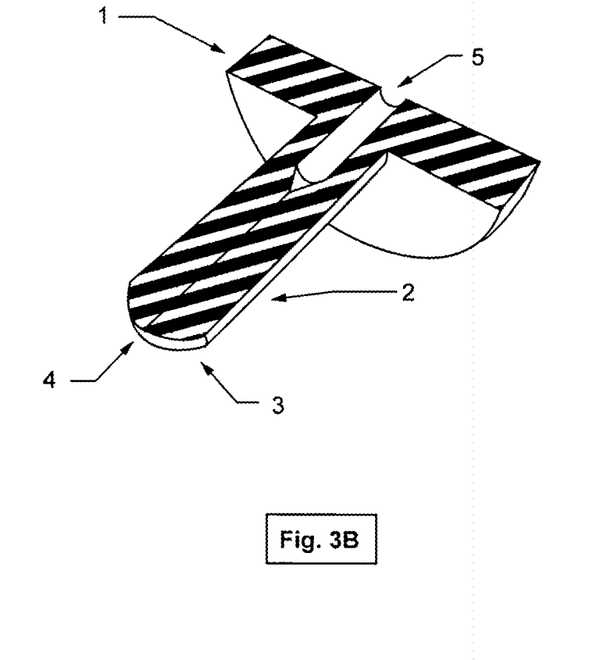

FIGS. 2, 3A and 3B are various views of the first embodiment of the valve that accepts the sports needle. The valve is made of elastic material such as rubber. These figures show valve in the closed position. The valve is of such a design that the valve can be opened and closed with the insertion and withdrawal of a common sports ball inflation needle. The top of the valve has a cylindrical flange with a circular opening. Below the flange is a stem that has a slit in it. The slit extends from the bottom of the opening to the bottom of the stem. The slit does not cut through the entire diameter of the stem. The slit only extends from the outside cylindrical wall of the stem to the center of the stem.

Figure 4:
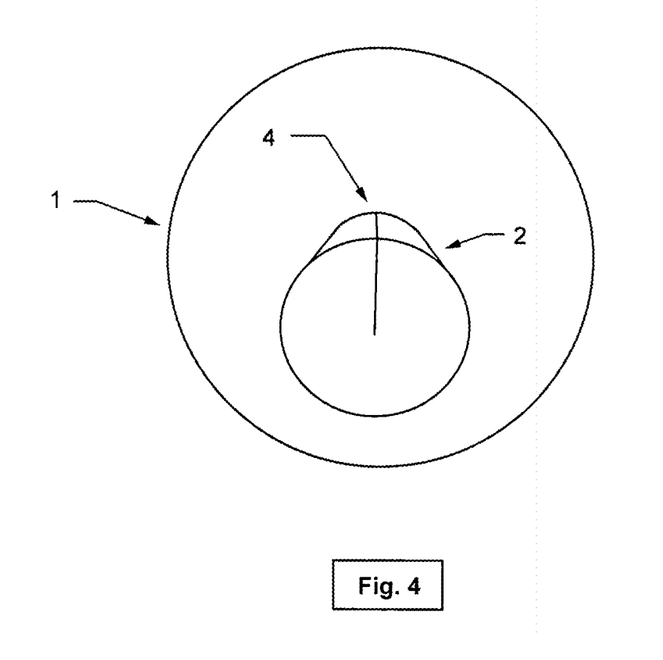
FIG. 4 is a bottom view of the first embodiment of the valve in the closed position. This is a view looking at the bottom of the stem. It shows that the slit only extends to a distance that is half of the diameter of the stem.

FIG. 4 is a bottom view of the first embodiment of the valve in the closed position. This is a view looking at the bottom of the stem. It shows that the slit only extends to a distance that is half of the diameter of the stem.

Figure 5:
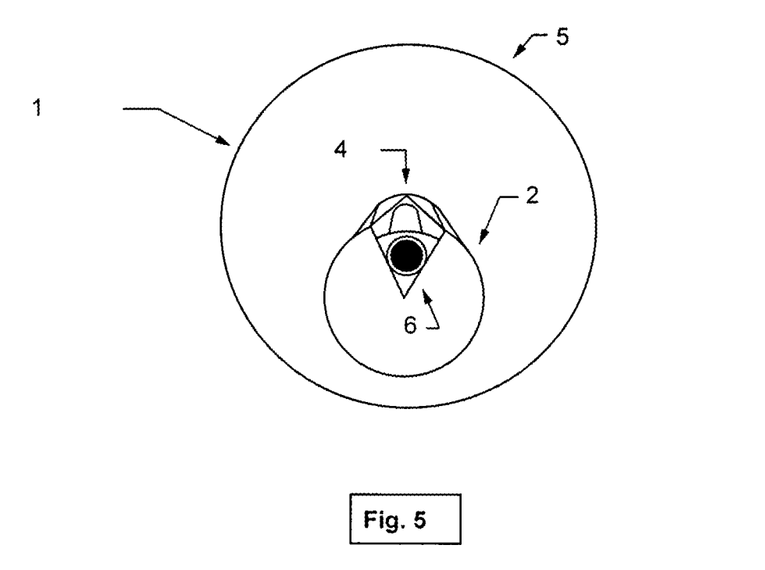
FIG. 5 is a bottom view of the first embodiment valve in the open position. This is a view looking at the bottom of the stem. It shows that the slit has been pushed open by the inflation needle.

FIG. 5 is a bottom view of the first embodiment valve in the open position. This is a view looking at the bottom of the stem. It shows that the slit has been pushed open by the inflation needle.

Figure 6:
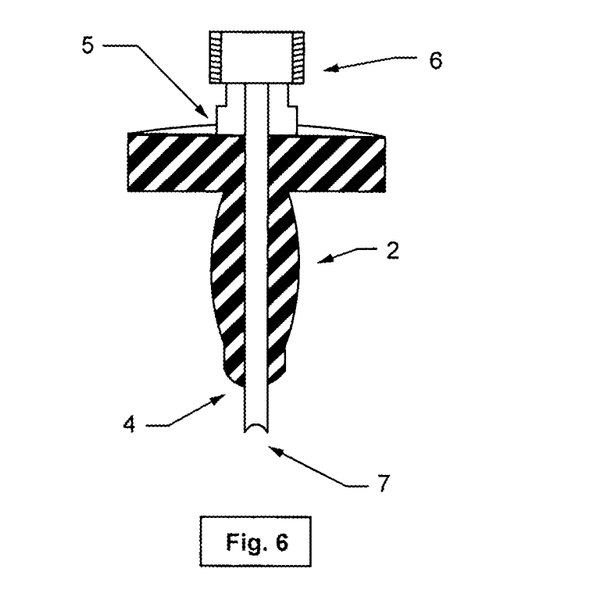
FIG. 6 is a cross section of the first embodiment of the valve with the inflation needle inserted through the valve.
Figure 7:
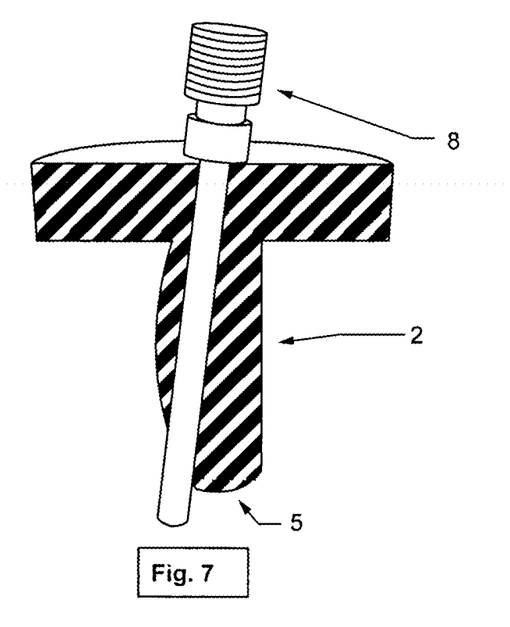
FIG. 7 a different cross section of the first embodiment of the valve with the inflation needle inserted through the valve.

FIGS. 6 and 7 are lengthwise cross sections of the first embodiment of the valve in the open position, with the inflation needle inserted into and through the valve. When the inflation needle is inserted through the opening of the needle valve and pushed toward the bottom of the stem, the shank of the inflation needle opens the slit in the stem of the valve. As the inflation needle is pushed in farther, it moves past the bottom of the stem and pushes the stem to the side. After the air opening at the end of the inflation needle shank has moved past the bottom of the stem, air can move through the valve in either direction, via the inflation needle.

Figure 8:
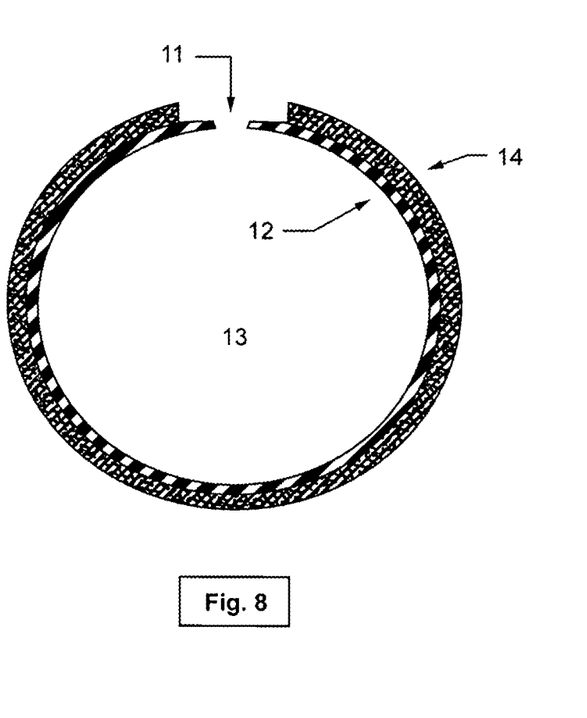
FIG. 8 is a cross section of the opening in the tennis ball where the first embodiment of the valve will be installed.

FIG. 8 is a cross section of the opening in the tennis ball where the first embodiment of the valve will be installed. A tennis ball has two layers: a rubber bladder and a felt cover. There is an interior gas space below the rubber bladder. This figure shows that there is a conical hole in the rubber bladder through which the stem of the valve is inserted. The diameter of the conical hole is wider at the outside of the rubber bladder (the "top" of the conical hole) and narrower at the inside of the rubber bladder (the "bottom" of the conical hole). This figure shows the area of the ball outer felt that is removed to accommodate the valve flange.

Figure 9:
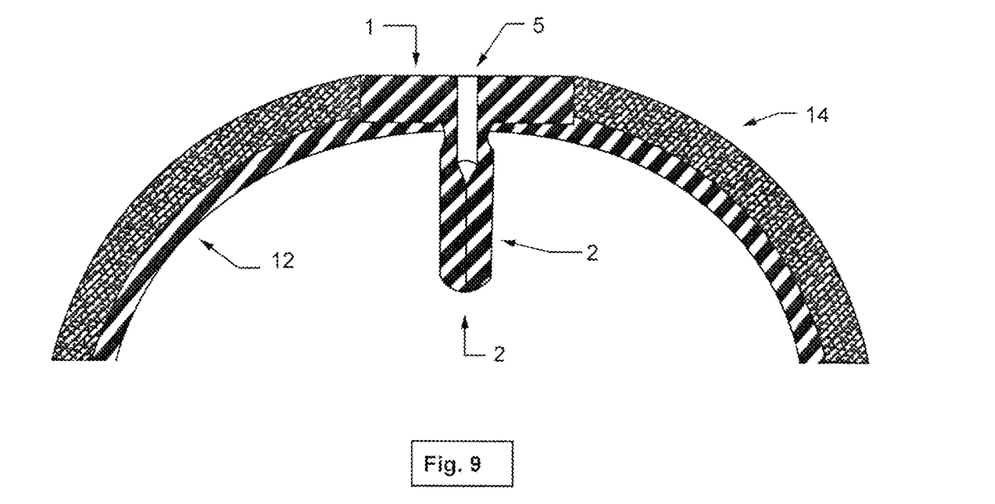
FIG. 9 is a cross section of the first embodiment of the valve installed in the tennis ball. The stem of the valve extends through the conical hole in the rubber bladder and into the interior gas space of the tennis ball. The diameter of the bottom of the conical hole is smaller than the diameter of the stem of the needle valve.

FIG. 9 is a cross section of the first embodiment of the valve installed in the tennis ball. The stem of the valve extends through the conical hole in the rubber bladder and into the interior gas space of the tennis ball. The diameter of the bottom of the conical hole is smaller than the diameter of the stem of the needle valve. There is enough elasticity in the material of the valve to allow the stem to be squeezed through the bottom of the conical hole during installation. Once the stem has been squeezed through, the bottom of the conical hole constricts the stem and prevents the valve from being pulled out of the opening of the tennis ball. Adhesive can be used to fasten the valve to the rubber of the tennis ball wherever the valve contacts the rubber and felt. After valve has been installed, the top of the flange is even with the top of the felt cover, the bottom of the flange rests against the rubber bladder and most of the stem extends into the interior gas space of the tennis ball beyond the inside of the rubber bladder.

Figure 10:
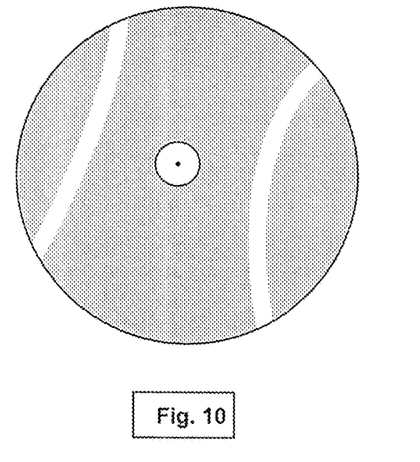
FIG. 10 is an overhead view of the first embodiment of the valve installed in the tennis ball. It shows the valve opening where the inflation needle is inserted. It also shows the top of the needle valve flange surrounded by the felt cover of the tennis ball.
Figure 11:
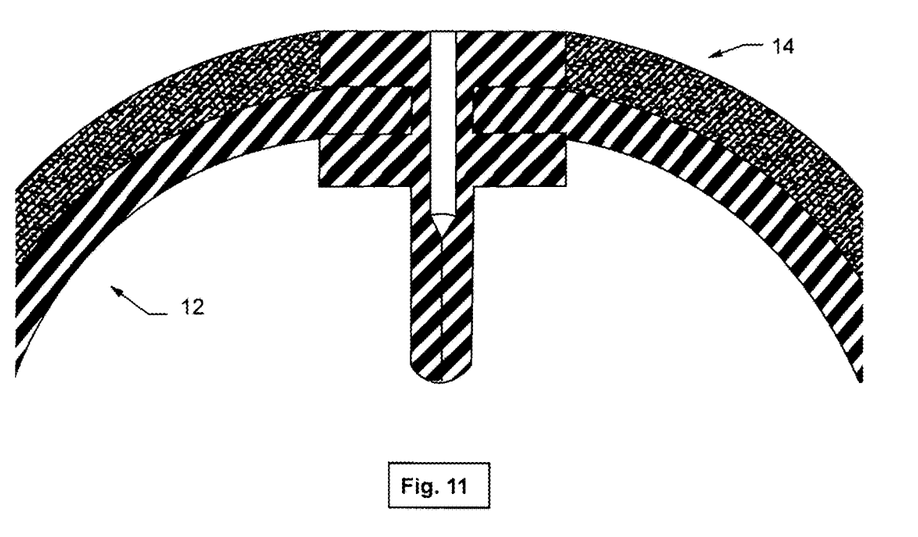
FIG. 11 is a cross section different embodiment of the valve installed in the tennis ball. The valve has an upper cylindrical flange which makes contact with the outside of the ball rubber and a lower cylindrical flange which makes contact with the inside of the ball rubber.
Figure 12:
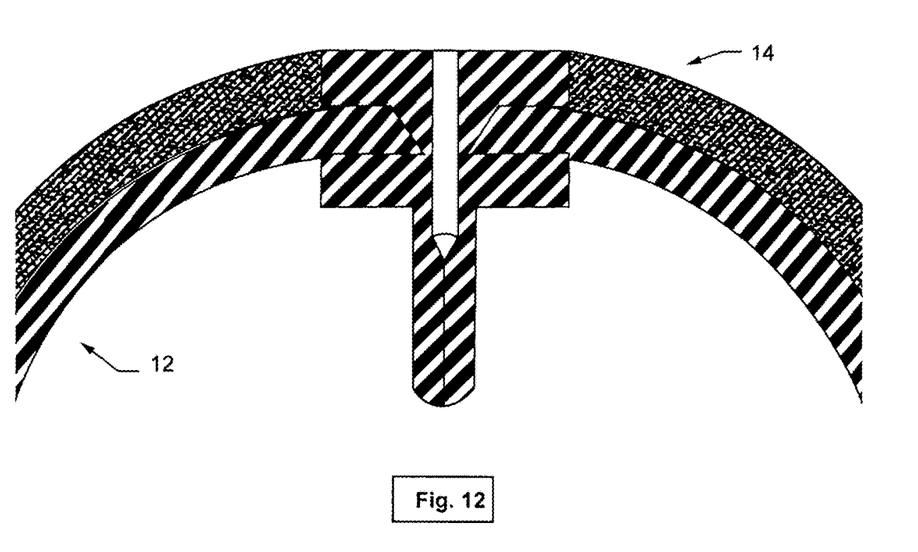
FIG. 12 is a cross section of a different embodiment of the valve installed in the tennis ball. The upper flange has a top part that is cylindrical and a bottom part that is conical so that the conical part of the upper flange makes contact with and fills the conical hole in the ball. The lower flange is cylindrical and makes contact with the inside of the ball rubber.
Figure 13:
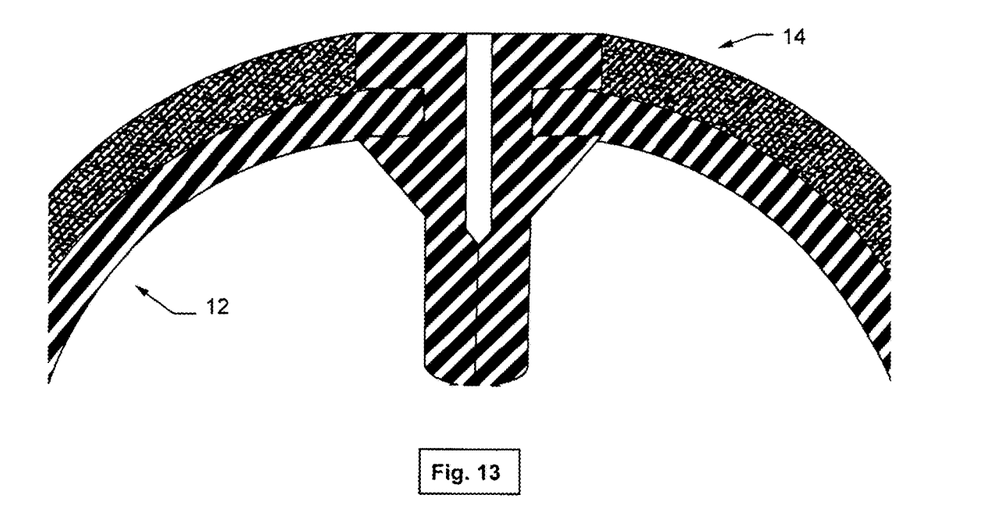
FIG. 13 is a cross section of a different embodiment of the valve installed in the tennis ball. The upper flange is cylindrical and it makes contact with the outside rubber of the ball. The lower flange is conical and the upper flat surface of the cone makes contact with the inside of the ball rubber.
Figure 14:
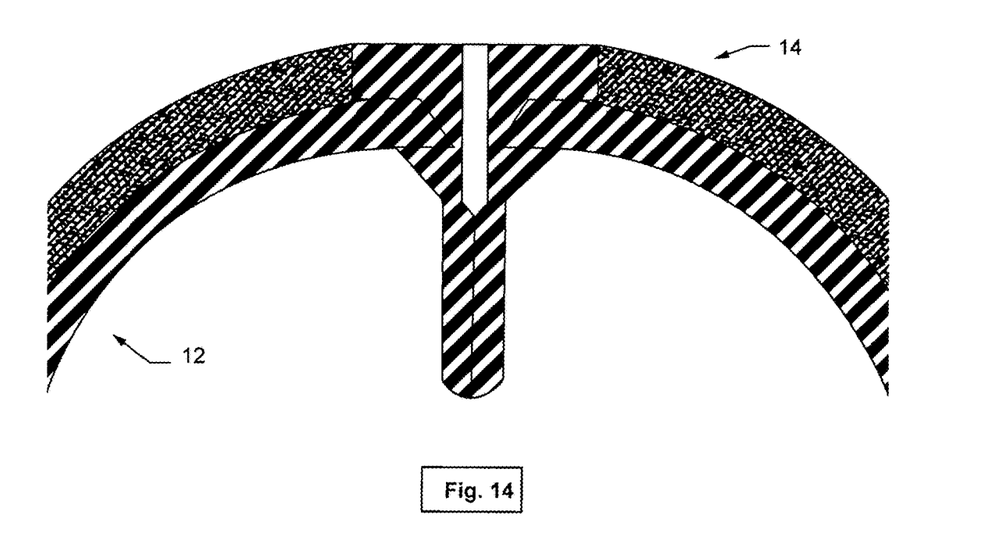
FIG. 14 is a cross section of a different embodiment of the valve installed in the tennis ball. The upper flange has a top part that is cylindrical and a bottom part that is conical so that is makes contact with and fills the conical hole in the ball. The lower flange is conical and the upper flat surface of the cone makes contact with the inside of the ball rubber.
Figure 15:
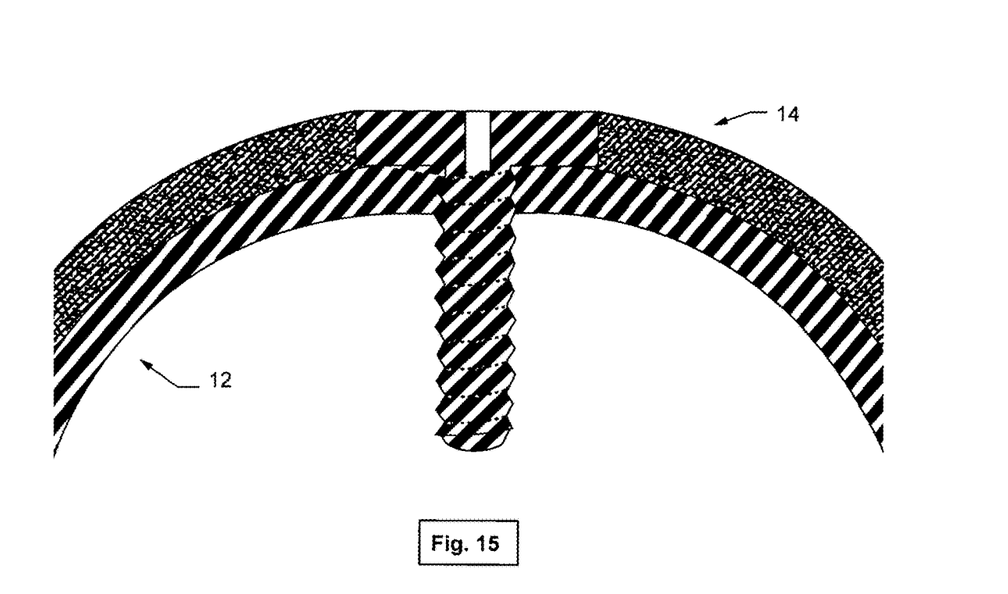
FIG. 15 is a cross section of a different embodiment of the valve installed in the tennis ball. The stem of the valve extends through a cylindrical hole in the rubber bladder and into the interior gas space of the tennis ball. The stem and the hole have threads so that the stem of the valve can screw into the hole in the ball.
Figure 16:
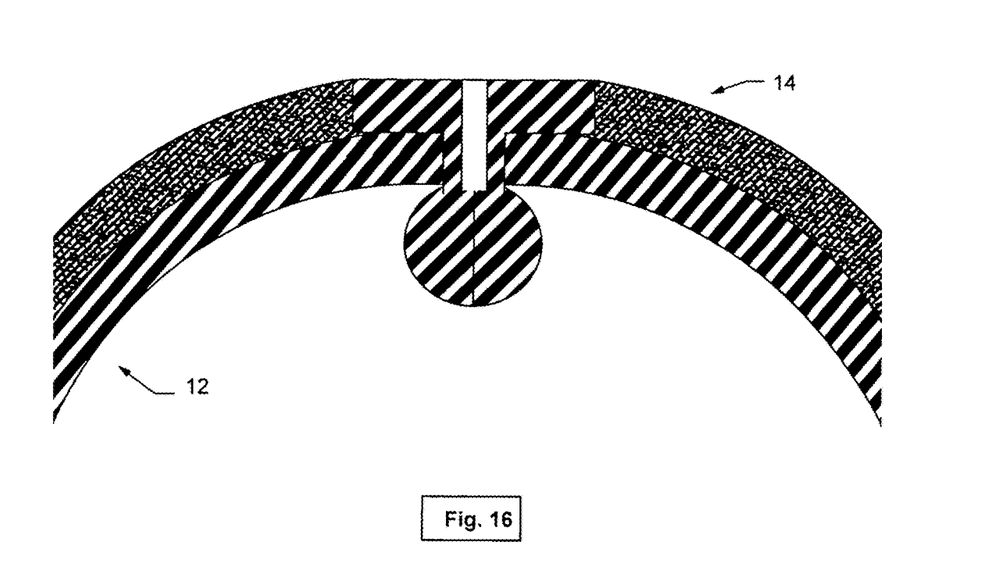
FIG. 16 is a cross section of a different embodiment of the valve installed in the tennis ball. The upper flange is cylindrical and it makes contact with the rubber of the ball. The lower flange is a sphere with a slit in it.
Figure 17:
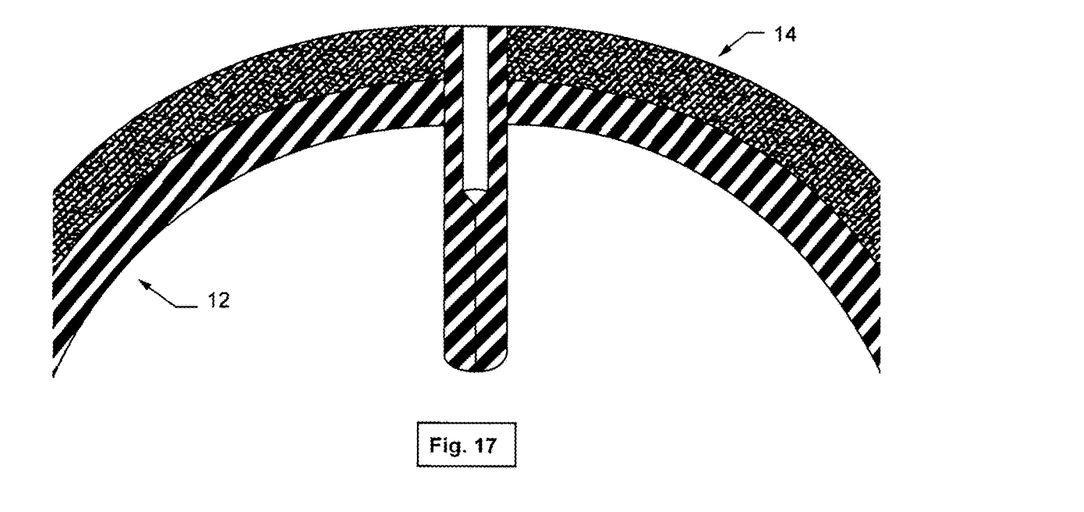
FIG. 17 is a cross section of a different embodiment of the valve installed in the tennis ball. It has a stem with no flanges. The upper part of the stem has an opening but no slit and the upper part of the stem is surrounded by the rubber and felt of the tennis ball. The lower part of the stem has a slit in it and extends into the interior gas space of the tennis ball.
Figure 18:
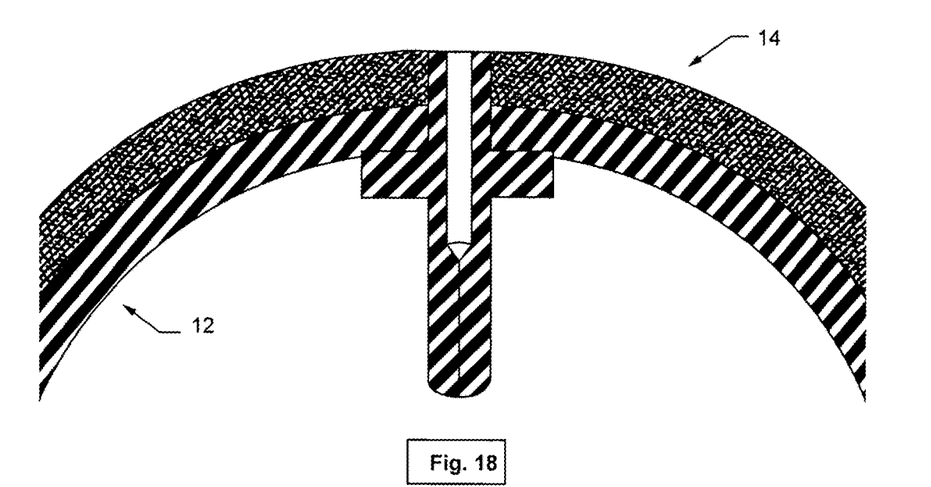
FIG. 18 is a cross section of a different embodiment of the valve installed in the tennis ball. It has a stem with no upper flange but a lower flange. The upper part of the stem has an opening but no slit and the upper part of the stem is surrounded by the rubber and felt of the tennis ball. The part of the stem below the lower flange has a slit in it which extends into the interior gas space of the tennis ball.
Figure 19:
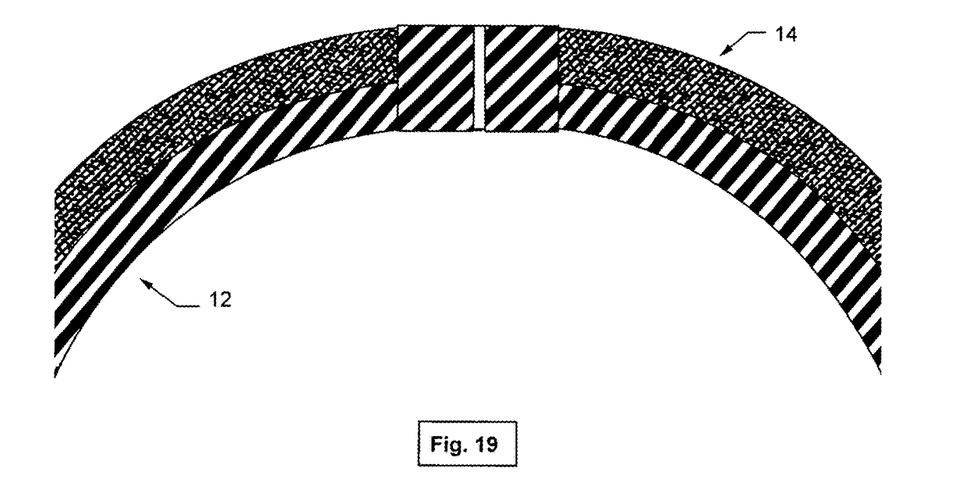
FIG. 19 is a cross section of a different embodiment of the valve installed in the tennis ball. It has no flanges or slits. The valve is surrounded by the rubber and felt of the tennis ball. The cylindrical opening is closed unless the inflation needle is inserted. The insertion of the inflation needle causes the sides of the cylinder to expand and allow the inflation needle to pass into and through the valve, thereby opening the valve.
Figure 20:
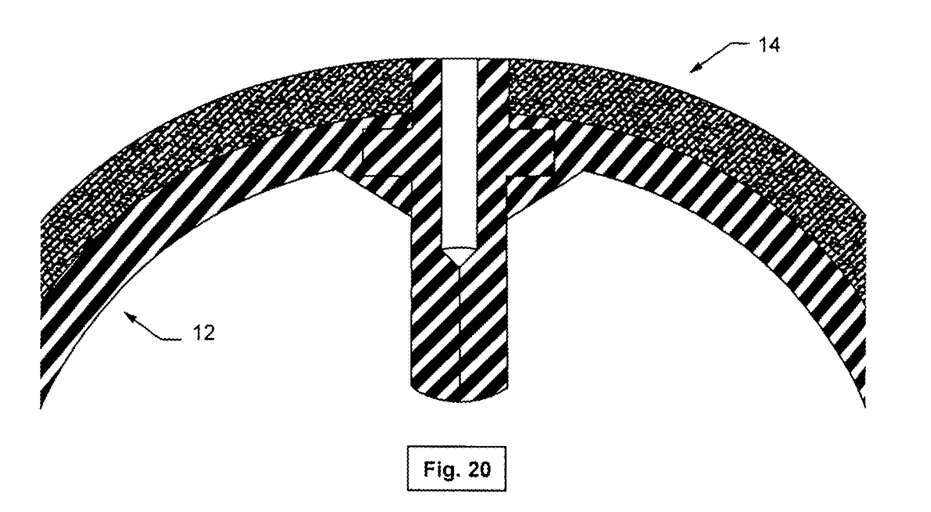
FIG. 20 is a cross section of a different embodiment of the valve installed in the tennis ball. It shows the valve embedded in the rubber of the tennis ball. The valve has one flange that is embedded in the rubber of the tennis ball and the stem with the slit that extends into the interior space of the tennis ball.
Figure 21:
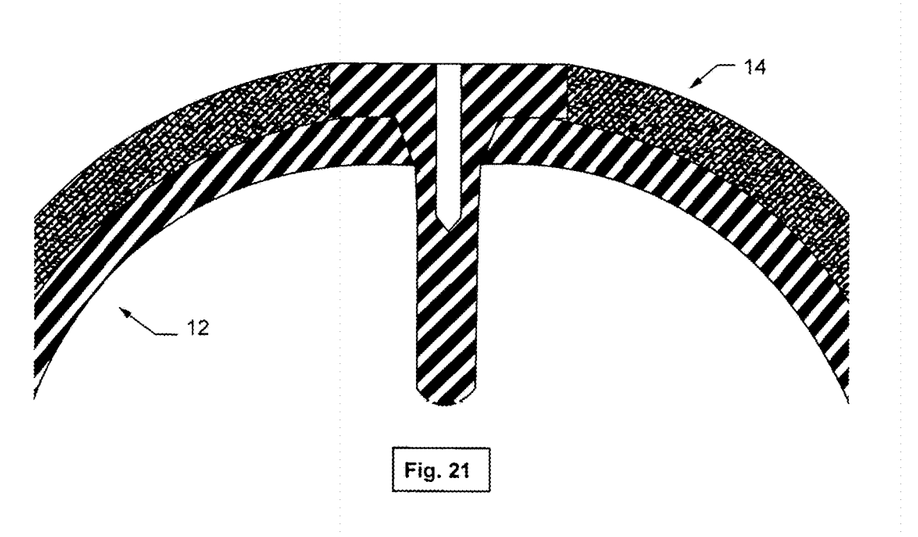
FIG. 21 is a cross section of a different embodiment of the valve installed in the tennis ball. The upper flange has a top part that is cylindrical and a bottom part that is conical so that the conical part of the upper flange makes contact with and fills the conical hole in the ball. There is no lower flange.

FIG. 10 is an overhead view of the first embodiment of the valve installed in the tennis ball. It shows the valve opening where the inflation needle is inserted. It also shows the top of the valve flange surrounded by the felt cover of the tennis ball.

OPERATION

First Embodiment—FIGS. 1 Through 10

After the valve has been installed in the ball, the operation of the valve is similar to that done with other inflatable sports balls. To increase the pressure inside the tennis ball, connect the inflation needle to source of positive pressure, such as a hand operated bicycle pump. Insert the inflation needle into the needle valve so that the air opening at the bottom of the needle valve reaches the interior gas space of the tennis ball. Pump air to flow through the valve, via the inflation needle, and into the ball. Keep the air flowing until the desired pressure is reached and then withdraw the inflation needle. To decrease the pressure inside the tennis ball, insert the inflation needle into the needle valve so that the air opening at the bottom of the needle valve reaches the interior gas space of the tennis ball. With a finger or other sealing method over the head end of the inflation needle to prevent air from quickly escaping from the ball, gently and gradually release the finger or other sealing method from the head of the inflation needle to allow air to slowly be released from the inside of the ball. When the desired pressure has been attained, withdraw the inflation needle. Air compressors, gauges and other commonly available equipment can be used to make the process quicker or more uniform and precise.

In this embodiment, it is necessary to make the hole in the tennis ball and then install the valve in the hole. The hole can be drilled in the felt and rubber using a combination of commonly available drills and bits. To install the valve, it is necessary to insert the stem of the needle valve in the conical hole and then push on the top of the flange and toward the ball. The stem of the valve will pass through the conical hole of the tennis ball and the lower surface of the needle ball flange will rest against the outside of the rubber bladder. Adhesive can be used to join the surfaces of the valve that make contact with the rubber of the ball. After assembly, a lubricant can be instilled through the opening of the needle valve, to ease insertion and withdrawal of the inflation needle. The valve can also be molded or otherwise installed through some other process at the time of ball manufacture, such as heat.

Many sports balls use a valve with a design and operation that is similar to that shown in this patent application. However, as far as this applicant knows, there are no valves that have the same design as shown in the first embodiment, nor are there any air valves of any kind used in tennis balls.

DESCRIPTION

Alternative Embodiments—FIGS. 11 Through 21

FIGS. 11 through 21 show other designs of valves that can be operated with common sports ball inflation needles. These other designs can also be made of an elastic material such as rubber. The various other embodiments shown in these figures have a variety of shapes, with or without flanges. As with the first embodiment, these valves can be installed in new or used tennis balls. The valve flanges can sit of the surface of the ball rubber or be embedded in the ball rubber. The valves can also be molded or otherwise installed through some other process at the time of ball manufacture, such as heat.

OPERATION

Alternative Embodiments—FIGS. 11 Through 21

The valves shown in FIGS. 11 through 21 are operated in the same manner as the valve in the first embodiment, using a common sports ball inflation needle.

CONCLUSION, RAMIFICATIONS AND SCOPE

The reader will see that at least one embodiment of the valve provides a more safe, simple, quick, inexpensive and repeatable method of increasing or decreasing the pressure of a tennis ball. Although the description above contains many specificities, these should not be construed as limiting the scope of the embodiments but merely as providing of some of several embodiments. Many other variations are possible. For example, the valve can be made of various substances and can have several shapes. The valve can be installed in various ways, with or without adhesive, at the time of ball manufacture, or after the ball manufacturing process is complete. The hole in the ball through which the stem of the valve is inserted can be conical, cylindrical or some other shape. The ball can be installed in new tennis balls or used tennis balls. Thus the scope of the embodiments should be determined by the appended claims and their legal equivalents, rather than by the examples given.

I claim:

1. A check valve made of an elastomer material configured to be installed in a tennis ball for the purpose allowing air to enter and exit an interior air space of said tennis ball with the use of a sports ball inflation needle, said valve comprising
   a) an outside, cylindrical flange portion having an upper surface,
   b) an annular body portion adjacent to said outside flange portion, said annular body portion having a diameter which is smaller than a diameter of said outside flange portion,
   c) a conical flange portion adjacent to said annular body portion, which said conical flange portion has the shape of a conical frustum, with a larger circle of the frustum being larger in diameter than the diameter of said annular body portion and located adjacent to said annular body portion,
   d) a hole extending through a central axis of the outside flange portion, said annular body portion, and said conical flange portion,
   e) a stem portion adjacent to said conical flange portion, said stem portion is connected to and has the same diameter as a smaller, second circle of said conical frustum,
   f) a single lengthwise slit in said stem portion at which said hole terminates; said slit is a closed slit that extends the entire length of said stem portion and extends radially from a central axis of said stem portion to an outside surface of said stem portion;
   whereby said valve is configured to be installed through a countersunk hole in a tennis ball, such that the upper surface of said outside flange portion is configured to be even with the outer surface of the felt layer of a tennis ball, said annular body portion is configured to make contact with and fully fill a hole in a rubber layer of a tennis ball, the larger circle of said conical flange portion is configured to make contact with an inside rubber surface of a tennis ball, and said stem portion is configured to extend into an interior air space of a tennis ball, so that a shank of a sports ball inflation needle can be inserted into the hole in said outside flange portion, said annular body portion, and said conical flange portion and through said stem portion, whereupon a shank of the sports ball inflation needle opens said slit in said stem portion and allows air with positive or negative pressure to enter or exit an interior air space of a tennis ball, thereby respectively increasing or decreasing air pressure inside a tennis ball, and said valve maintaining the new pressure when a shank of the sports ball inflation needle is withdrawn which allows the slit to close and seal further flow of air into or out of a tennis ball.

\* \* \* \* \*